(12) United States Patent
Cormier et al.

(10) Patent No.: US 10,537,149 B2
(45) Date of Patent: Jan. 21, 2020

(54) MULTI-STAGE ENERGY ABSORBER

(71) Applicant: VICONIC SPORTING LLC, Dearborn, MI (US)

(72) Inventors: Joel M. Cormier, Lathrup Village, MI (US); Richard F. Audi, Dearborn, MI (US); Donald S. Smith, Commerce, MI (US); Dane R. Winbigler, Harper Woods, MI (US)

(73) Assignee: VICONIC SPORTING LLC, Dearborn, MI (US)

( * ) Notice: Subject to any disclaimer, the term of this patent is extended or adjusted under 35 U.S.C. 154(b) by 0 days.

(21) Appl. No.: 14/635,259

(22) Filed: Mar. 2, 2015

(65) Prior Publication Data

US 2016/0255898 A1    Sep. 8, 2016

(51) Int. Cl.
| | | |
|---|---|---|
| *F16F 7/12* | (2006.01) | |
| *A42B 3/12* | (2006.01) | |
| *B60R 21/04* | (2006.01) | |
| *A41D 13/05* | (2006.01) | |
| *A41D 13/06* | (2006.01) | |
| *A41D 13/08* | (2006.01) | |

(52) U.S. Cl.
CPC .......... *A42B 3/124* (2013.01); *A41D 13/0512* (2013.01); *A41D 13/065* (2013.01); *A41D 13/08* (2013.01); *A41D 13/088* (2013.01); *B60R 21/04* (2013.01); *F16F 7/12* (2013.01)

(58) Field of Classification Search
CPC ... F16F 7/12; F16F 7/121; F16F 7/122; B60R 21/04; B60R 2021/0414
See application file for complete search history.

(56) References Cited

U.S. PATENT DOCUMENTS

| | | | |
|---|---|---|---|
| 3,877,076 A | 4/1975 | Summers et al. | |
| 5,030,501 A * | 7/1991 | Colvin | B32B 3/12 |
| | | | 206/522 |
| 6,199,942 B1 | 3/2001 | Carroll, III et al. | |
| 6,247,745 B1 | 6/2001 | Carroll, III et al. | |
| 6,453,476 B1 | 9/2002 | Moore, III | |
| 6,536,052 B2 | 3/2003 | Tao et al. | |
| 6,679,967 B1 | 1/2004 | Carroll, III et al. | |
| 6,682,128 B2 | 1/2004 | Carroll, III et al. | |

(Continued)

OTHER PUBLICATIONS

International Search Report and Written Opinion; related International application No. PCT/US2016/012700; dated Mar. 11, 2016.

*Primary Examiner* — Nicholas J Lane
(74) *Attorney, Agent, or Firm* — Brooks Kushman P.C.

(57) ABSTRACT

An energy absorbing liner system that offers a multi-stage reaction to impact and is positioned inside a member that receives an impact. The energy absorbing liner system has one or more interconnected energy absorbing modules that rebound after one or more impacts. At least some of the modules in the layer have a basal portion with multiple levels of reaction to impact. For example, a first stage has one or more membranes. A second stage has energy absorbing units with bendable walls. The membranes extend between the walls of adjacent energy absorbing units. The membranes alone or in combination with the side walls of the units at least partially cushion the blow in multiple stages of reaction by progressively absorbing energy imparted by an object that impacts the outer shell.

10 Claims, 4 Drawing Sheets

(56) References Cited

U.S. PATENT DOCUMENTS

| | | | |
|---|---|---|---|
| 6,752,450 B2 | 6/2004 | Carroll, III et al. | |
| 6,777,062 B2 | 8/2004 | Skaja | |
| 6,908,143 B2 * | 6/2005 | Ashmead | F16F 7/121 |
| | | | 206/521.1 |
| 7,338,038 B2 | 3/2008 | Maurer et al. | |
| 7,360,822 B2 | 4/2008 | Carroll, III et al. | |
| 7,377,577 B2 | 5/2008 | Carroll, III et al. | |
| 7,404,593 B2 | 7/2008 | Cormier et al. | |
| 7,625,023 B2 | 12/2009 | Audi et al. | |
| 7,625,036 B2 | 12/2009 | Cormier et al. | |
| 7,628,444 B2 | 12/2009 | Cormier et al. | |
| 7,676,854 B2 | 3/2010 | Berger et al. | |
| 7,802,320 B2 | 9/2010 | Morgan | |
| 7,895,681 B2 | 3/2011 | Ferrara | |
| 7,908,678 B2 | 3/2011 | Brine, III et al. | |
| 7,954,177 B2 | 6/2011 | Ide et al. | |
| 7,958,573 B2 | 6/2011 | Lewis, Jr. et al. | |
| 8,353,640 B2 | 1/2013 | Sawyer | |
| 8,465,087 B2 | 6/2013 | Gerwolls et al. | |
| 2002/0070584 A1 * | 6/2002 | Carroll, III | B32B 3/28 |
| | | | 296/187.03 |
| 2005/0161982 A1 * | 7/2005 | Cormier | A62B 1/22 |
| | | | 296/214 |
| 2005/0230205 A1 * | 10/2005 | Springler | B60R 21/04 |
| | | | 188/377 |
| 2008/0035442 A1 | 2/2008 | Spingler et al. | |
| 2010/0244469 A1 * | 9/2010 | Gerwolls | B60R 21/04 |
| | | | 293/120 |
| 2013/0152287 A1 | 6/2013 | Cormier et al. | |
| 2013/0192286 A1 | 8/2013 | Wang et al. | |
| 2014/0007322 A1 | 1/2014 | Marz et al. | |
| 2014/0027964 A1 * | 1/2014 | Gerwolls | F16F 7/128 |
| | | | 267/140.11 |
| 2014/0097052 A1 | 4/2014 | Reynolds et al. | |

* cited by examiner

MULTI-STAGE ENERGY ABSORBER

BACKGROUND OF THE INVENTION (1) Field of the Invention

One aspect of the invention relates to an impact-receiving surface such as a helmet supported by a multi-stage energy absorbing liner system that progressively receives and redistributes energy generated by an impacting force.

(2) Description of Related Art

It is known that energy equals force times distance. In the case of impacts sustained by the head or other anatomical member, impact forces and impact energy translate into accelerations with both linear and rotational components. Such accelerations are experienced by the brain and brain stem during and after an impacting event. In an attempt to minimize such impact forces, energy absorbers are deployed for example in helmet systems in an attempt to reduce the forces and resultant percussive loads experienced by an underlying mass, such as the brain.

The effectiveness of any energy absorbing system depends on its relative stiffness and crush efficiency over the range of impact energies the system is expected to experience. The ideal force displacement response for linear impacts has a relatively "square wave" shape. Idealized square wave energy absorbers ramp up quickly and maintain a relatively constant load throughout the impact event that maximizes the amount of energy capable of being absorbed. The ultimate goal is to maximize the stroke such that the majority of the energy is absorbed at the lowest possible load and thus minimizes the forces experienced by an underlying mass, such as the brain.

Non-linear impacts (e.g., off-angle hits) may induce harmful, injurious rotations of the brain relative to the brain stem. Helmet energy absorbers with homogeneous properties tuned for linear impacts are typically so rigid that they fail to stroke substantially and remain "coupled" to the head in a non-linear off-axis event.

While more displacement may be available in the off-angle impact than when an impact is "normal" to the head, this stroke advantage is often wasted. The majority of advanced helmet development testing is currently focused on decoupling the helmet liner from the head. This allows the helmet to slip relative to the skull, thereby reducing the rotation of the brain about the brain stem with traditional energy absorbing materials such as foam.

In one example, 6D Systems developed a single use impact system for motorsports that was well received by the ASTM in a 2013 conference. However, its price point is several times higher than the average helmet liner system, requires replacement after an impact event, exhibits a relatively poor stroke efficiency of less than 65%, and lacks a strain rate response to the incoming impact energy.

Among the art considered before filing this application are these references:

| Assignee Name | USPN | Material |
| --- | --- | --- |
| Riddell | 7,954,177 | Foam |
| Brine | 7,908,678 | Foam |
| Xenith | 7,895,681 | TPU |
| Team Wendy | 6,453,476 | Foam |
| Gentex | 7,958,573 | Foam |
| Morgan | 7,802,320 | Foam |
| Crescendo | 7,676,854 | Plastic |
| Skydex | 6,777,062 | TPU |

Also reviewed were: U.S. Pat. No. 8,353,640; U.S. published application nos. 2013/0152287; 2014/0007322 and 2014/0097052.

Additionally, several of Applicant's patents (see, e.g., U.S. Pat. Nos. 6,199,942; 6,247,745; 6,679,967; 6,682,128; 6,752,450; 7,360,822; 7,377,577; 7,404,593; 7,625,023; 7,625,036; 7,628,444; 8,465,087 and U.S. published applications (see, e.g., 2013/0192286 and 2013/0152287) which are incorporated herein by reference) describe embodiments of an efficient, modular, tunable energy absorbing assembly for reducing the severity of an impact event.

Ideally, a helmet energy absorbing system would be optimized for both low and high energy impact events both normal to and inclined or tangential to the head.

Helmet manufacturers have moved away from foam and into engineered thermoplastic energy absorbing systems. Helmet manufacturers such as Schutt, Zenith, and Cascade/Bauer have recognized the linear impact performance advantages of thermoplastic helmet liners in their helmet systems. However, these systems are largely focused on compliance to established linear impact standards such as NOCSAE, ASTM, and CSA. These standards do not take into account balancing non-linear events with linear events. Nor do they address lower energy impact events such as those experienced in youth sports. Additionally, many of these systems employ a common energy absorbing structure around the entire periphery of the helmets that fails to consider the unique spatial constraints of the impact including the shape of the skull, impact reaction surface, impact angle, and rotation induced in the brain stem based on impact position relative to the head center of gravity.

BRIEF SUMMARY OF THE INVENTION

Disclosed is a multi-stage (preferably two-stage) energy absorber interposed between an impact-receiving surface and a member that is to be protected from the impact. One non-limiting example of a protected member is a human skull. In response to an applied load of sufficient force, the first stage of the energy absorber (termed herein as a "membrane") bends and/or collapses to absorb an initial portion of the impact energy. If the applied force is substantial enough to fully stroke the first stage, one or more subsequent stages (termed herein as "energy absorbing units") deflect and absorb at least some of the remaining impact energy. Preferably, a second stage is between 2-10 times stiffer than the first stage.

In one embodiment, there is a helmet with an outer shell and a multi-stage energy absorbing layer positioned on or adjacent to a surface of the shell that lies opposite to the surface that receives the blow. The layer has one or more preferably interconnected energy absorbing modules.

Preferably one or more energy absorbing units in a given module have a curvilinear substantially frustoconical wall with a cap or membrane ("first stage" energy absorber) that lies near or in contact with the inner surface of the outer shell of the helmet. The membrane arches across and between adjacent energy absorbing units and is a domed thin walled cap that is relatively compliant in relation to the walls of the associated energy absorbing units ("second stage" energy absorber). In a first response to an impact, the membrane deflects. If the impacting force is of sufficient magnitude, a second level of reaction ("second stage") is provided by the walls of at least some energy absorbing units.

In some embodiments, some or all of the walls and the membranes cooperate to absorb the blow and perhaps recoil non-destructively at least partially to or towards an un-deflected state after impact. The membranes are helpful in absorbing at least some of the off-axis impacting forces. The units and the membranes at least partially cushion the blow by absorbing energy imparted by an object that impacts the outer shell.

If desired, one or more ribs interconnect the walls of at least some of the energy absorbing units in one or more modules.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
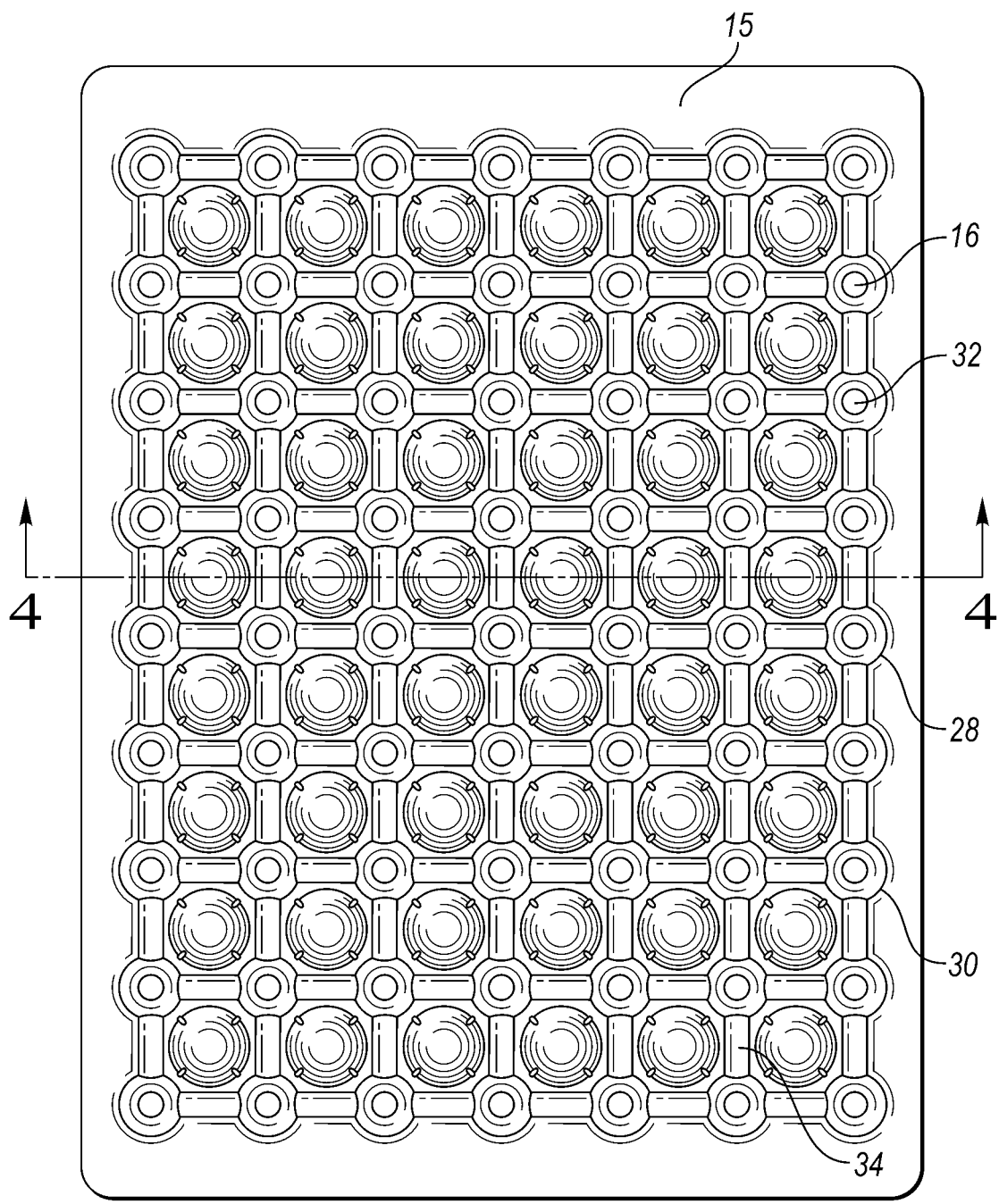
FIG. 1 is a top plan view of one illustrative inventive embodiment of an energy absorbing module that at least partially reverts to or towards an un-deflected configuration non-destructively after one or more impacts.
Figure 2:
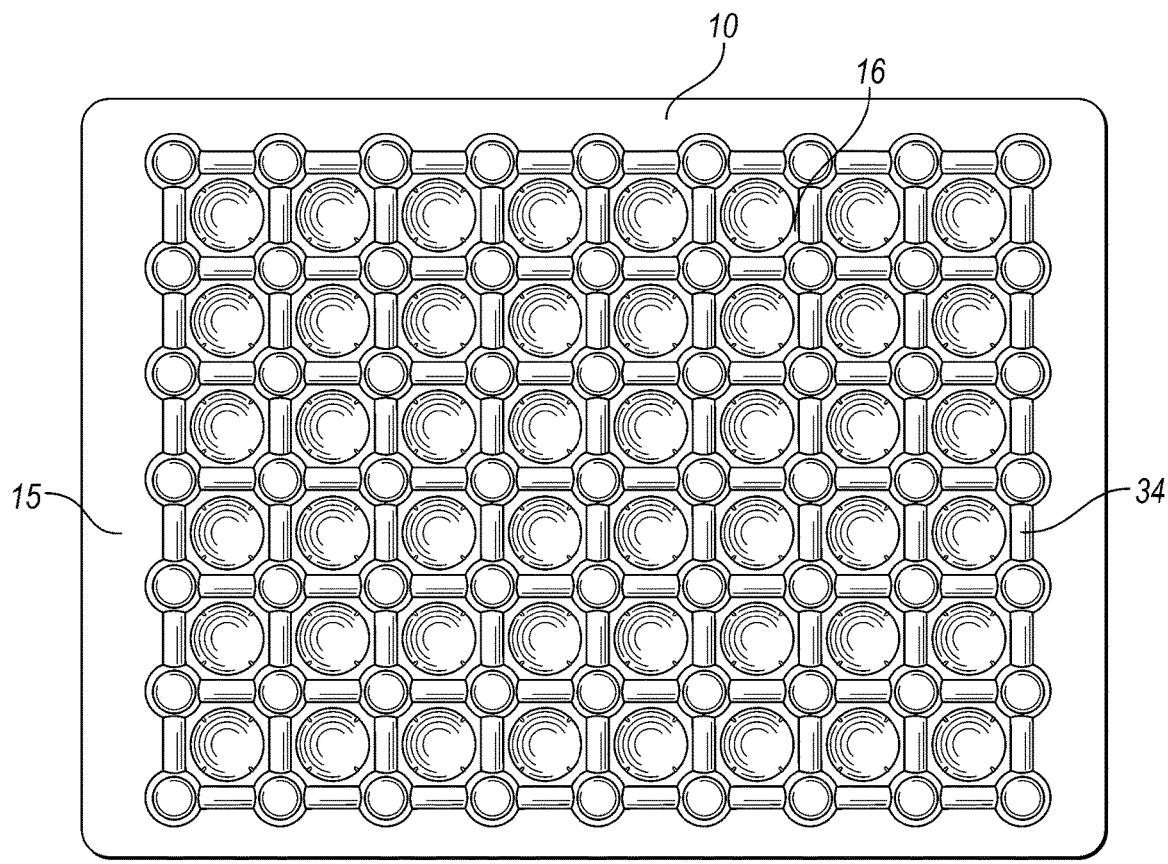
FIG. 2 is a bottom view of the embodiment shown in FIG. 1.

In one embodiment of the invention (FIGS. 1-3), there is an incident surface such as a helmet 10 with a resilient outer shell 12 that meets an impacting or impacted object, often with virtually no change in shape after impact, dents excepted. Besides a helmet, other incident surfaces include for example, a vehicular headliner, a knee bolster, a bumper and a steering wheel, plus various personal protectors, such as an elbow guard, a shoulder pad, an abdominal protector, a knee pad, and a wrist pad.

A multi-stage energy absorbing layer or liner system 14 is positioned inside the shell 12. The layer 14 has an assembly of one or more preferably thermoformed energy absorbing modules 16 that either fit together (like a jigsaw puzzle) or are structurally interconnected. One such module is shown in FIGS. 1-4. The modules 16 cooperate to afford an energy absorbing structure that may rebound following a hit to or toward a pre-impact configuration in such a way that at least parts of the modules 16 may or not be destroyed by one or repeated blows. A practical consequence is that the helmet need not be replaced after each hit. Such may not be the case, for instance, where a cyclist sustains a blow to a conventional helmet in competition.

At least some of the modules 16 in the layer 14 (FIG. 3) have upper 20 ("second stage") and lower 22 ("first stage") sections when viewed in relation to an object to be protected, e.g., the wearer's head 24. Thus, the upper section 20 is closest to the outer shell 12 of the helmet 10 while the lower section 22 is closest to the wearer's head 24. Hence, the upper section 20 is positioned toward the inner surface 26 of the outer shell 12 and the lower section 22 lies closer to the head 24 of a wearer.

Preferably the upper section 20 has one or more energy absorbing units 28 that extend from a basal layer 15. At least some of the units 28 are provided with a rounded or curvilinear wall 30 that in some embodiments is substantially frustoconical with an optional floor 32 that may be flat or domed. As used herein, the term "curvilinear wall" means that the wall 30 appears straight or linear when viewed from the side and rounded when viewed from above or below.

Figure 3:
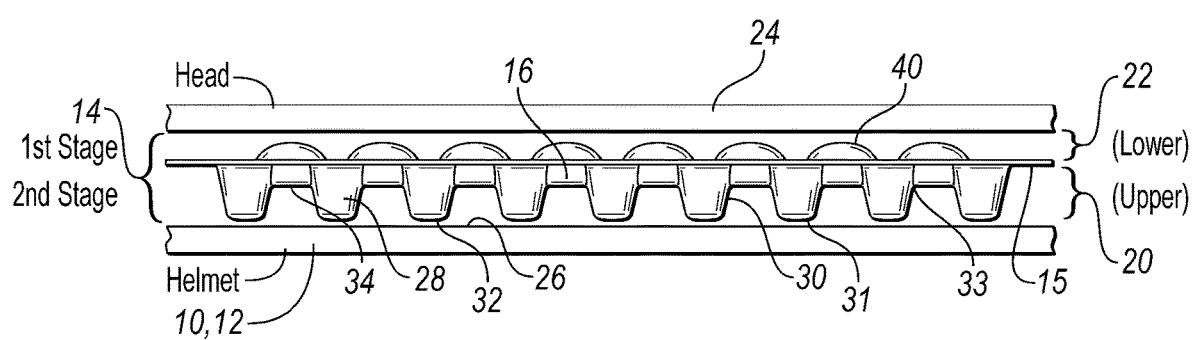
FIG. 3 is a side view of the module of FIG. 1 lying between an object that receives an impacting blow and an object to be protected.
Figure 4:
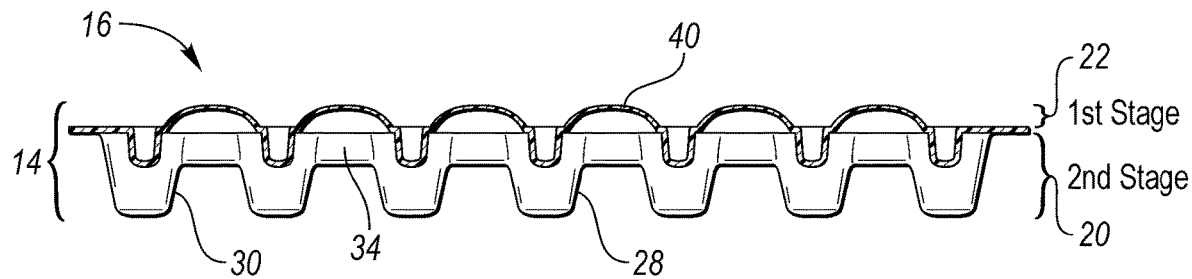
FIG. 4 is a sectional view taken along the line 4-4 of FIG. 1.
Figure 5:
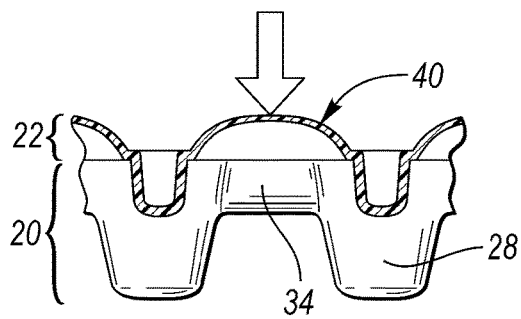
FIG. 5 is an enlargement of part of the module shown in FIG. 4 before and at impact.
Figure 6:
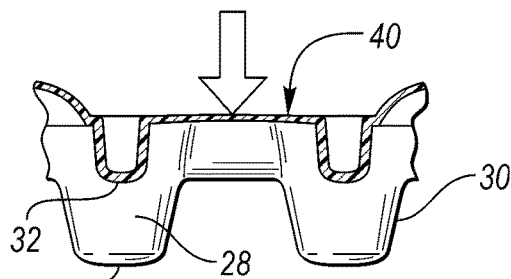
FIG. 6 shows the part of the module of FIG. 5 after a first stage energy absorber is stroked out.

The wall 30 and the floor 32 define a lower perimeter 31 where they intersect (FIG. 3). The lower perimeter 31 has a shape that is selected from the group consisting of a circle, an oval, an ellipse, an oblate oblong, a polygon, a quadrilateral with rounded edges and combinations thereof. Generally, the shape lacks sharp edges that may otherwise promote an undesirable stress concentration. An upper perimeter 33 at the top of the wall 30 also defines a shape that is selected from the group consisting of a circle, an oval, an ellipse, an oblate oblong, a polygon, a quadrilateral with rounded edges and combinations thereof. The shape of the upper perimeter 33 in several embodiments resembles that of the lower perimeter 31. But their sizes are not necessarily equal, so that an energy absorbing unit 28 may be tapered. Usually the lower perimeter 31 is shorter than the corresponding upper perimeter 33.

Bridging across some adjacent units is a membrane 40 that preferably is domed and also extends from the basal layer 15. In some embodiments however, the membrane assumes a pre-impact configurations with portions lying adjacent to the wearer's head that are at least partially or completely flattened. The membrane 40 offers a first level of reaction to impacting forces and serves as the first stage of the disclosed multi-stage (preferably two-stage) energy absorbing system. It offers a first response to energy absorption by deflecting more than the walls 30 (second stage) of the energy absorbing units 28 in response to impact. After a hit, the impacting force is first received by the outer shell 12 of the helmet 10. The force is then transferred first to the membranes 40, which absorb some or all of the blow, depending on its direction and magnitude. If the hit is hard enough, what remains of the blow is communicated by the membranes 40 to the energy absorbing units 28. The membranes 40 and the units 28 at least partially cushion the blow and may revert to or toward an un-deflected configuration after absorbing energy imparted by an object that impacts the outer shell 10. If desired, a membrane 40 may be lacerated for added compliance, i.e., be cut or define a groove.

Reversion occurs without substantial loss of structural integrity so that bounce back is essentially non-destructive. If desired, one or more ribs 34 interconnect the walls 30 of at least some of the energy absorbing units 28 in one or more modules 16.

This multi-stage (preferably dual-) stage phenomenon becomes important in off-angle impacts where the primary force vector has a component that is substantially tangential to the surface of the head or other member or object 24 to be protected. The near-tangential components of incident forces result in relatively small forces normal to the head. Research at leading institutions has shown that the ability to absorb these low energies and for the system to displace and stroke reduces the shear and rotational forces experienced by the brain. If the impact is relatively normal to the head and of substantial energy, the second stage 20 is engaged and absorbs energy in a manner similar to that of single stage energy absorbers (see, FIG. 9). Therefore, by providing a dual-stage energy absorber, both low and high energy impact can be managed in a single energy absorbing assembly.

In some embodiments, the membrane 40 is more or less frustoconical and has a flattened surface. From the player's perspective, the flat topped membrane 40 may prove more comfortable as it distributes the load over a larger surface area.

The energy absorbing structures disclosed herein are capable of being tuned by deploying a suitable grade of ether TPU material, the base thickness of the sheet from which the energy absorbing units extend, and the frustoconical height, shape and spacing of adjacent units to optimize the system level of performance. Thermoforming allows performance tuning by changing the base sheet thickness and material type that is thermoformed over the tool. Alternatively, injection molding processes can be used to make the disclosed energy absorbing system.

If desired, apertures may be introduced into the module 14 to allow air flow and improve the convective cooling of the mass to be protected, such as the head. Supplemental air flow may also be created by employing additional ribbing or channels. If desired, holes may be provided in one or more ribs to permit air flow, cleaning and fluid drainage for cleaning purposes. These additional air flow channels are also anticipated to reduce the blast pressures that the wearer's head would experience in a blast pressure wave and/or an impacting event.

One aspect of the invention thus includes a helmet 10 and a helmet liner system 14 that, when engineered for a given set of impact conditions, will provide a mass-optimized helmet liner 14 with rebound characteristics, superior impact protection, fit, comfort, breathability, and durability at a reasonable cost.

By modifying the shape and orientation of energy absorbing modules 16 and over-arching membranes 40, the resistance of the energy absorber 14 can be tuned to optimize performance around the entire helmet shell 12. The global stiffness of the absorber 14 can also be tuned by running thinner or thicker sheet material off a thermoforming tool to soften or stiffen the absorber respectively. Additionally, unlike foam, the energy absorbing layer 14 is not solid and has superior cooling characteristics.

Anticipated uses for the disclosed technology include but are not limited to helmets for soldiers, athletes, workers and the like, plus automotive applications for protecting a vehicle occupant or a pedestrian from injury involving a collision. It is also anticipated that this technology could be applied anywhere that some level of comfort and protection are required in an energy absorbing environment, including all types of padding, flooring, cushions, walls, and protective equipment in general.

As noted earlier, FIG. 1 is a top plan view of one illustrative embodiment of the invention—an energy absorbing liner 14 for an overlying combat helmet 10 (not shown). In most embodiments, the liner system 14 includes a single module or a plurality of interconnected modules 16. FIG. 3 is a section through a typical energy absorbing module 16. These modules 16 may have multiple energy absorbing units 28 based upon the performance and comfort characteristics desired in a given liner system 14 or module 16.

If desired for conformance to the environment of use, a living hinge may join at least some adjacent modules 16 of the energy absorbing layer 14.

Traditionally, hook and loop materials of adhesive have been utilized to attach the helmet liner 14 to the helmet shell 12. Also anticipated is the use of other means for attaching, such as rivets, coined snaps, add-on fasteners, tape, Velcro® and glue to affix the liner to the shell.

Shown as examples in FIGS. 4-8 are the energy absorbing portions of a helmet liner 14. A preferred embodiment is a one piece construction of interconnected modules 16. Each module 16 has membranes 40 and associated energy absorbing units 28. This design requires fewer components to assemble. This attribute reduces the assembly and labor costs, complexity, and number of purchased components. Fewer attachments and components are necessary to adhere the helmet liner 14 to the helmet shell 12 partially because the modules 16 tend to afford mutual support and assure predictable placement in relation to the helmet 10. Attachment holes (not shown) can also be provided and offer an additional way to adhere the liner 14 to the helmet shell 12.

Figure 9:
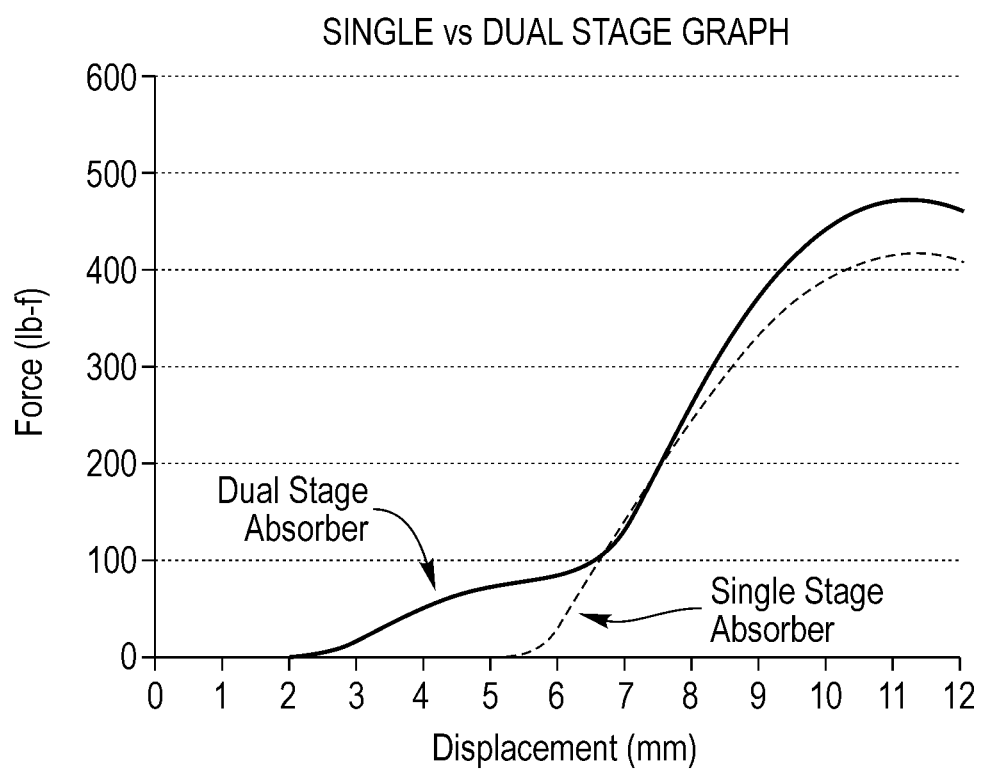
FIG. 9 is a Force-Displacement graph that illustrates a typical response of single and dual-stage energy absorbers to impact.

Helmet liner systems are designed to absorb and mitigate some of the blunt forces or blast energy from an event. Initial testing (see, e.g., FIG. 9) indicates that superior impact performance can be obtained when compared to certain prior art, in this case, a single-stage absorber. FIG. 9 is a force versus displacement graph comparing the energy absorbing response of a single stage absorber (shown as a dashed line) and one embodiment of a dual stage energy absorber of the claimed invention (shown as a solid line). The initial slope of the solid dual stage curve is gradual and achieves a square wave plateau of approximately 80 lb-f. This gradual slope illustrates some compression and energy absorbed regardless of the magnitude of the initial load.

Comparing second stage response to an applied load to the dashed line single stage response, the slope of both curves increase rapidly until a second plateau is achieved at approximately 425 lb-f. The response of the dual stage absorber is superior to that of the single stage absorber as it allows for substantially more displacement when the applied load is small. Additionally, this response does not inhibit its ability to manage the load in the high energy impact events like the traditional single stage absorber. This ultimately provides the wearer enhanced impact protection from both low and high energy impact events compared to the prior art. This enables a helmet system to be realized that is safer than those which preceded it.

The impact performance of the disclosed system may be tuned or optimized according to the intended use—for example to the skill level of the athlete for recreational sporting helmets. Youth sporting equipment may be less stiff (e.g., formed from a thinner gage of material) and tuned to the speed and mass of the athlete. Professional athletes may require a stiffer absorber due to their increased mass, speed, and aptitude.

Additionally, the assembly is often lighter in weight and more comfortable than those found in the prior art. The materials of construction are also more resilient to repeat impacts when compared to the prior art.

Figure 7:
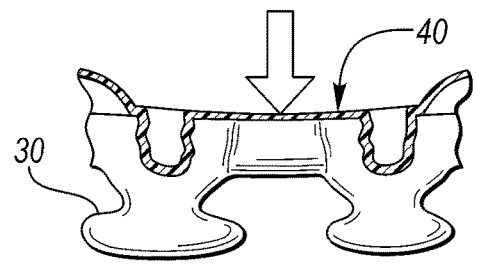
FIG. 7 shows the part of the module of FIG. 6 during deflection of a second stage energy absorber.
Figure 8:
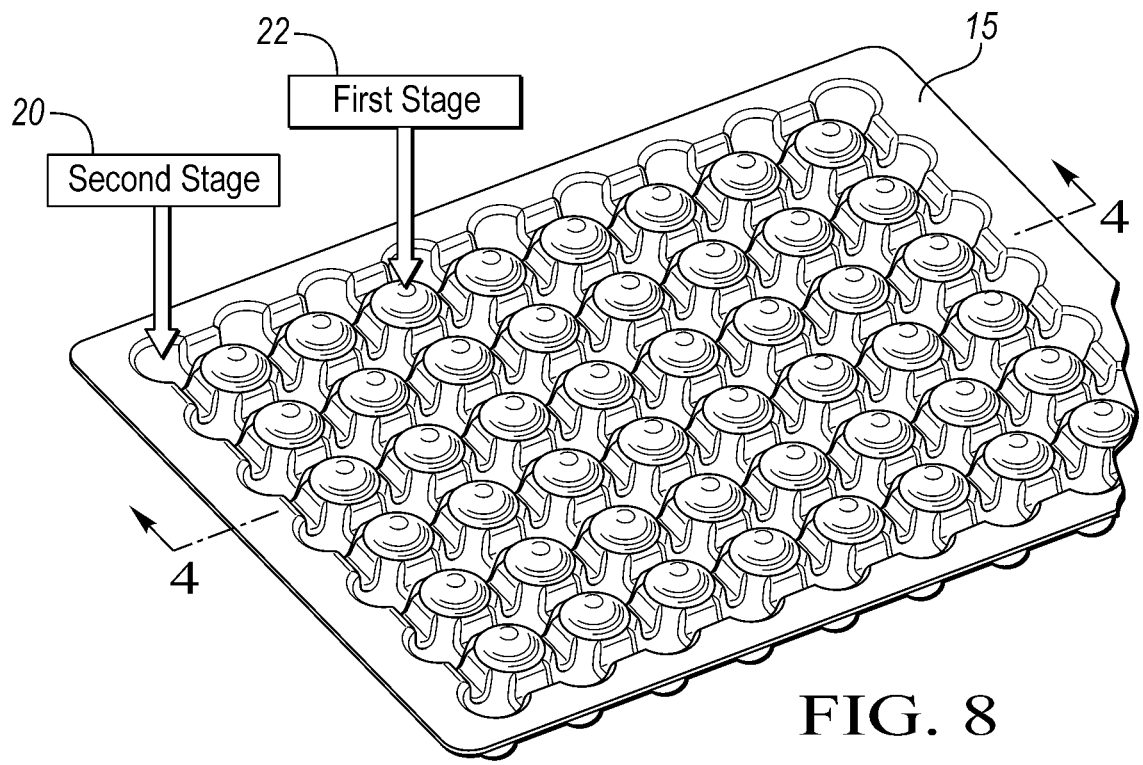
FIG. 8 is a quartering perspective view of the module shown in FIG. 1.

In another aspect of the invention (see, e.g., FIGS. 3-7), the energy absorbing layer 14 includes an upper first stage 22. The second stage 20 has a plurality of energy absorbing units 28, many of which are frustoconical. Each energy absorbing unit 28 has a side wall 30 that may be flat when viewed from the side, or be stepped. The wall 30 is oriented so that upon receiving the (action or reaction) forces of impact ("incident forces", FIGS. 5, 6), those forces remaining after absorption by the first stage 20 encounter the side wall 30. The wall 30 offers some resistance, deflects and may revert (spring back) to or towards the un-deflected pre-impact configuration while exerting reactionary forces to oppose the incident forces (FIG. 7). This phenomenon effectively cushions the blow by offering progressive multi-stage levels of reaction to impacting forces that are directed towards the mass or object to be protected (e.g., an anatomical member, a piece of sheet metal, an engine block, or the head of a passenger or player).

After the resistance offered by the flat or domed membranes 40 is exhausted, the side wall(s) 30 while deflecting (e.g., by columnar buckling) absorb energy if residual forces remain (FIG. 7). Each energy absorbing unit has a floor 32—which may be domed or flat—which is placed on or near the helmet 12 (FIG. 3). It will be appreciated that use of the term "floor" should not be construed literally because its position will depend on the orientation of the energy absorbing layer 14 when installed. After the energy absorbing characteristics of the membrane 40 are exhausted, the side wall 30 may revert at least partially towards an un-deflected configuration within a time (T) after impact, thereby absorbing energy substantially non-destructively after the hit.

In some cases, parts of the energy absorbing layer 14 revert to or toward an un-deflected configuration after a first impact.

To absorb impact forces, the side wall 30 of the second stage 22 bends in response to impact and springs back to an un-deflected configuration in further response to impacting forces (FIG. 7). In some cases opposing side walls 30 in an energy absorbing unit 28 bend at least partially convexly after impact. In other cases, opposing side walls 30 bend at least partially concavely after impact. Sometimes, opposing side walls 30 bend at least partially concavely and convexly after impact in an accordion-like fashion.

If the floor 32 is domed and supported by a lower periphery 31 of the side wall 30, it may deflect inwardly, thereby itself absorbing a portion of the energy dissipated upon impact. Afterwards, it may or may not at least partially spring back to an initial configuration.

Aided by these structures, the disclosed energy absorber 14 can be re-used after single or multiple impacts. For example the cyclist, hockey or football player need not change his helmet after every blow. This is because part of the blow is absorbed by the membranes 40. Thereafter, the side walls 30 revert toward an un-deflected configuration within a time (T) after the hit. Usually 0<T <about 90 seconds. Most of the recovery occurs quite soon after impact. The remainder of the recovery occurs relatively late in the time period of recovery, by analogy to a "creep" phenomenon.

Additional air flow through orifices or channels provided in the helmet liner 14 improves head cooling and provides some level of increased protection from blast events when compared to previous approaches.

Further, the Applicant's soft top technology may also be employed to minimize the potential for unwanted noise (BSR) from the assembly. See e.g., U.S. Pat. No. 8,465,087 and U.S. patent publication no. 2012/0032458 which are incorporated herein by reference.

In some applications, it may be desirable to orient the upper section 20 so that the energy absorbing units 28 face upwardly and the floor 32 is juxtaposed with the object 24 to be protected.

The preferred material of construction is durable, resilient, hydrolytically stable and chemical resistant.

By comparison to prior art approaches, the disclosed thermoplastic energy absorbing systems have demonstrated the ability to optimize energy absorbing performance, given the spatial constraints and relative stiffness and shape of a rigid body or skull 24, superior crush efficiency, adaptability to incoming energy, and durability. The systems disclosed herein have an inherent advantage in non-linear events in that they are anisotropic. Such liners are slightly more compliant during impact events which are not normal to the reaction surface, thereby taking advantage of the additional stroke available and ultimately reducing the "g" forces experienced by the head relative to foam.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy absorbing liner system that is interposed between an incident surface that receives an impacting force and a mass to be protected from at least some of the impacting force, the energy absorbing liner system having
   one or more energy absorbing modules that offer a dual stage resistance to impacting forces, one or more of the energy absorbing modules having
   a basal layer between the incident surface and the mass to be protected;
   a first stage energy absorber extending from the basal layer toward the mass to be protected with one or more membranes that bend and /or collapse and have domed thin tops at least some of the membranes offering a first level of reaction to impacting forces that are low or high energy impact events normal to and inclined or tangential to the mass to be protected;
   a second stage energy absorber extending from the basal layer toward the incident surface the second stage energy absorber having one or more energy absorbing units, the energy absorbing units extending from the basal layer the energy absorbing units having a wall with an upper perimeter proximate the basal layer, the energy absorbing units providing a second level of reaction to what remains of the impacting forces after at least partial absorption by the one or more membranes, the one or more energy absorbing units at least partially absorbing energy generated by an impacting object by the wall bending inwardly or outwardly or inwardly and outwardly without rupture,
   ribs formed from the basal layer that extend between adjacent pairs of the energy absorbing units, the ribs forming a quadrilateral pattern, one of the membranes lying within the quadrilateral pattern; and
   wherein at least some of the membranes have a stiffness characteristic such that the second stage energy absorber is between 2 and 10 times stiffer than the membranes in the first stage, the first stage thereby at least partially absorbing low energy impacts and reducing shear and rotational forces experienced by the mass to be protected and thus providing an energy absorber that offers at least two levels of reaction to the impacting force.

2. The energy absorbing liner system of claim 1, wherein the incident surface that cooperates with the one or more energy absorbing modules in response to the impacting force is selected from the group consisting of a helmet, an automotive headliner, an anatomical member, a knee bolster, a bumper, a steering wheel, a knee pad, an elbow guard, a shoulder pad, an abdominal protector, a vehicular floor, a vehicular panel and a wrist pad.

3. The energy absorbing liner system of claim 1, wherein the one or more modules are made by a process selected from the group consisting of thermoforming, injection molding and combinations thereof.

4. The energy absorbing liner system of claim 1, wherein the wall of an energy absorbing unit defines a substantially frustoconical surface.

5. The energy absorbing liner system of claim 1 wherein the wall of an energy absorbing unit has a lower edge proximate the incident surface that defines a lower perimeter, the lower perimeter defining a shape that is selected from the group consisting of a circle, an oval, an ellipse, an oblate oblong, a polygon, a quadrilateral with rounded edges and combinations thereof.

6. The energy absorbing liner system of claim 1, wherein at least some energy absorbing units have floors that are substantially flat and lie adjacent to the incident surface.

7. The energy absorbing liner system of claim 1, wherein the one or more energy absorbing units revert to or towards a pre-impact configuration after impact.

8. The energy absorbing liner system of claim 1, wherein the wall of an energy absorbing unit bends in response to impact and springs back to an un-deflected configuration in further response to impacting forces.

9. The energy absorbing liner system of claim 1, wherein at least some of the energy absorbing units have floors that are domed and extend towards the incident surface.

10. The energy absorbing liner system of claim 1, wherein at least some of the membranes are lacerated for added compliance.

* * * * *